Inventors
J. B. Thompson.
G. C. Hildred.
by:
Attorney

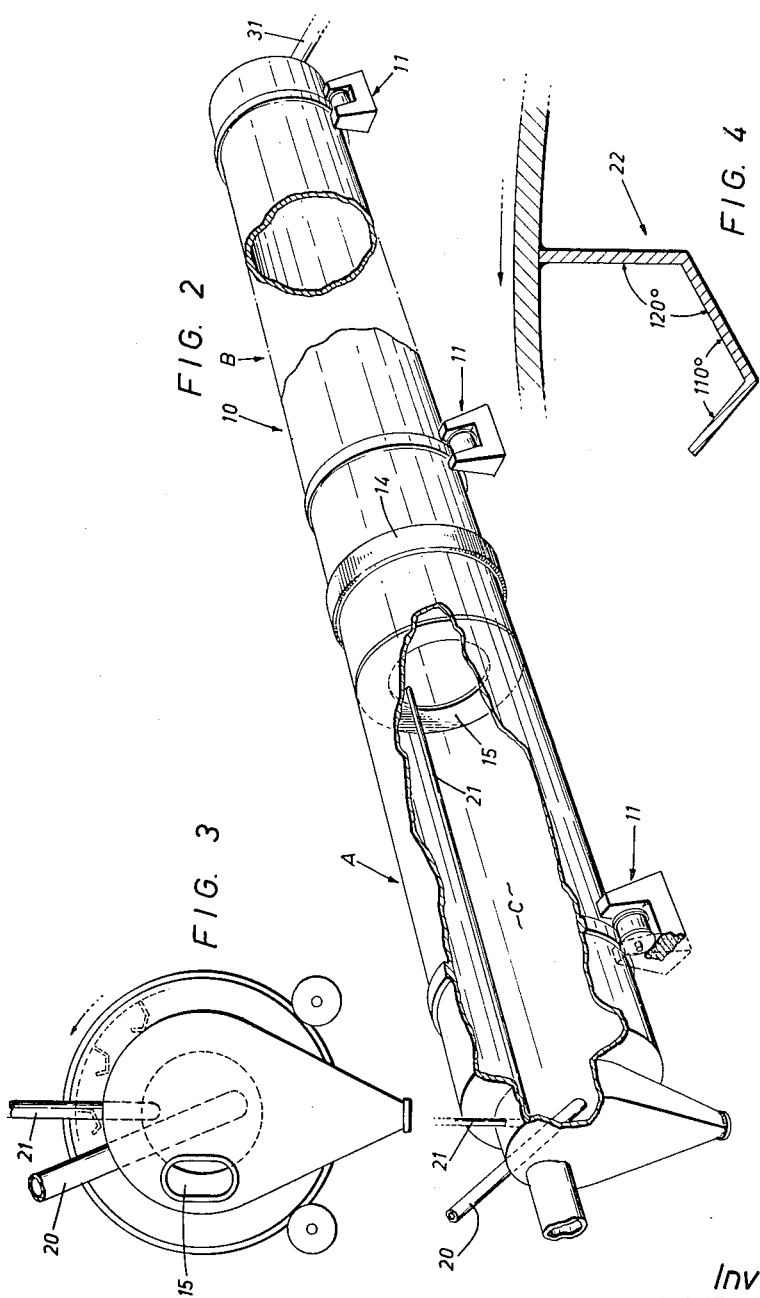

United States Patent Office 3,232,703
Patented Feb. 1, 1966

3,232,703
PROCESS FOR THE PRODUCTION OF
AMMONIUM NITRATE
Joshua B. Thompson and Gordon Charles Hildred, Trail, British Columbia, Canada, assignors to The Consolidated Mining and Smelting Company of Canada Limited, Montreal, Quebec, Canada, a corporation of Canada
Filed Apr. 23, 1962, Ser. No. 189,551
10 Claims. (Cl. 23—103)

This invention relates to a process for the production of chemical fertilizer in granular form. It is particularly directed to providing a process for the production of ammonium nitrate granules which are characterized by their low moisture content, their strong, hard, physical structure, high density and reduced tendency to cake.

Processes for the production of ammonium nitrate prills, granules or pellets are well known and are in relatively widespread use. Known processes include that in which a concentrated, for example 95%, aqueous solution of ammonium nitrate is sprayed into the upper part of a tower. The droplets are cooled and solidify as they settle downwardly through the tower in counter-current to the upward flow of cooling gas. The so-formed prills are collected from the bottom of the tower and dried. This process is disclosed in the Williams et al. Patent No. 2,402,192, issued June 18, 1946. Prills recovered from the spray tower must be cooled and dried under carefully controlled conditions to extract moisture from the cores of the prills without destroying the crystalline structure of the shells.

Patent No. 2,934,412 issued April 26, 1960, discloses a modification of the Williams et al. process in which molten, substantially anhydrous ammonium nitrate is sprayed into a gaseous cooling medium. Prills produced by this latter process have the disadvantage that they are of a wide range of sizes and have voids in the surfaces which tend to reduce their strength and their resistance to impact and the surfaces tend to be glassy which makes difficult the treating of the prills with a conditioning agent, such as diatomaceous earth, due to poor dust adherence.

It is also known that fertilizer pellets can be produced in a granulator by contacting moving particles of chemical fertilizer with an aqueous slurry or a solution of fertilizer. In United States Patent No. 1,969,894, issued August 14, 1934, a modification of this type of "mixing" process is disclosed in which a plunger is employed for mixing ammonium phosphate fines with a slurry comprised of ammonium phosphate particles and ammonium phosphate solution. With the aid of a re-circulation circuit, the fine granules are built step by step, to production size. A normal operating re-circulating load to production ratio is of the order of about 8:1.

A further modification of the "mixing" type process is disclosed in United States Patent No. 2,926,079, issued February 23, 1960 in which fertilizer mixtures are produced by coating fertilizer particles with an aqueous slurry which contains a substantial amount of fertilizer solids. In the provided bed of nuclei of a fertilizer substance having a particle size of at least about 40 mesh and a moisture content below the agglomeration point, constant agitation and the film coating resulting from the liquid phase present produce a physical separation from each other of a substantial portion of the nuclei. Separated nuclei are passed through a hot (120° C.–540° C.), gaseous atmoshpere into which is sprayed an aqueous slurry of fertilizer substances in the form of fine droplets whereby the separated nuclei are contacted by the fine droplets and coated with slurry.

We have found that this "mixing" type process also has certain disadvantages, particularly in the production of ammonium nitrate pellets. The temperature to which the drying air can be heated for treatment of ammonium nitrate is limited by the low fusion point of the particles and by the liquid phase present which tends to weaken physically the coated nuclei. Substantial disintegration of the pellets occurs if they are screened while hot. Also, we have found, in the production of ammonium nitrate pellets, that the pellets produced by spraying a concentrated aqueous solution into a hot gas and onto ammonium nitrate nulcei tend to be structurally too weak for sizing by screening even if they contain as little as 0.35% moisture when their temperature is above about 80° C. Maintaining the product temperature below 80° C. limits the amount of liquid phase which can be tolerated in the bed of nuclei and makes necessary the use of a much larger granulating vessel than is required for the same rate of production of other types of fertilizer pellets having a higher fusion point than ammonium nitrate. Also, we have found in the production of ammonium nitrate by this process that the dust loss usually is relatively high when spraying with solution of the normal ammonium nitrate concentration used in prilling, for example about 95% concentration, and this dust load must be re-cycled, thereby substantially reducing the productive capacity of the granulating unit.

We have found that disadvantages in the operation of, and in the ammonium nitrate pellets produced by, known processes can be overcome when a superheated melt of substantially anhydrous ammonium nitrate is sprayed into continuously cascading solid ammonium nitrate particles while simultaneously contacting the particles and melt with a current of cooling air entering the process at ambient temperature, that is, the temperature of the atmosphere surrounding the process equipment.

The process of the present invention comprises, in general, forming a bed of moving, solid particles of ammonium nitrate, spraying molten, substantially anhydrous ammonium nitrate at a temperature of from about 5 to about 25 centigrade degrees above its crystallization temperature onto said bed and into a curtain of solid particles of ammonium nitrate continuously cascading downwardly onto said bed and simultaneously contacting the continuously cascading particles with a current of cooling air.

An important object of this process is to obtain, as a product, ammonium nitrate granules of low moisture content; of strong, hard, physical structure; of high density; of reduced tendency to cake; and of a particle size larger and more closely sized than obtainable in existing processes, in the range —6 mesh (Tyler, 0.131 inch screen opening) to +14 mesh(Tyler, 0.046 inch screen opening), preferably —6 mesh to +10 mesh (Tyler, 0.005 inch screen opening).

An understanding of the process of this invention can be obtained from the following description, to which the scope of the process is not restricted, reference being made to the accompanying drawings in which:

FIGURE 2 is an elevation, in section and in perspective, of a preferred embodiment of a rotary granulating and cooling apparatus;

FIGURE 3 is an end elevation of the granulating and cooling apparatus illustrated in FIGURE 2; and FIGURE 4 is an enlarged detail view of a lifting element.

Like reference characters refer to like parts throughout the description of the invention and the drawings.

Figure 1:
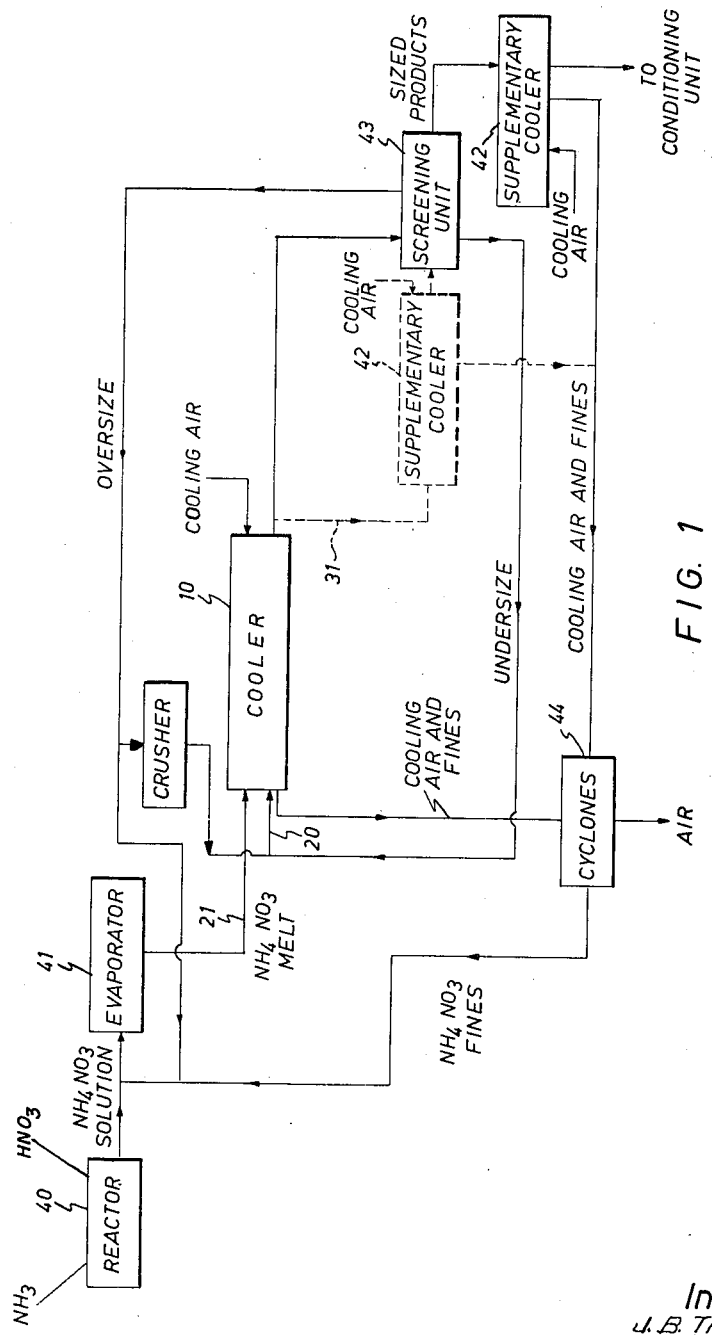
FIGURE 1 is a flowsheet of an overall process for the production of ammonium nitrate in which the process of this invention is incorporated as a step.

Referring to FIGURES 2 and 3 of the drawings, the numeral 10 indicates a cooler rotatably supported on roller wheels enclosed in boxes 11 and driven by a motor through a train of speed reduction gears, not shown, the last of which is meshed with a ring gear 14 which encircles the cooler.

The cooler can be formed of a steel shell and is divided transversely by an upstanding retaining ring 15 into a coating-cooling chamber A and a cooling chamber B. During operation, the coating-cooling chamber A encloses a contact zone C in which solid particles of ammonium nitrate are simultaneously contacted with sprayed molten, substantially anhydrous, ammonium nitrate and cooling air, and the cooling chamber B encloses a cooling zone.

An inlet 20 for finely divided particles of ammonium nitrate is provided at the inlet end of the coating-cooling chamber. A spray feed pipe 21 extends into the coating-cooling chamber, being centrally located and is connected to a source of molten, substantially anhydrous ammonium nitrate. The spray feed pipe is provided with one or more nozzles, not shown, from which molten ammonium nitrate is sprayed in the form of fine droplets whose size can be controlled by the spraying pressure and which, while falling through the current of cooling air, impinge on cascading particles and on bed particles in the region of the lifters emerging from the tilted moving bed. Lifting bars 22 are secured to the interior wall of the coating-cooling chamber from a point adjacent to, but spaced from the inlet end to a point adjacent to but spaced from the retaining ring 15.

The cooling chamber B also is equipped with lifting bars. A chute 31 is provided for discharging cooled granules from cooling chamber B.

Ambient temperature air is drawn into cooling chamber B at the granule discharge end. In the present application, ambient temperature air refers to air at the temperature of the atmosphere surrounding the process equipment. Air at this temperature enters the cooling zone. In the case where the contact zone and the cooling zone are enclosed within one vessel, the increased temperature of the air entering the contact zone results solely from heat exchange with the coated nitrate particles in the cooling zone. Where the contact zone and the cooling zone are enclosed in separate vessels, the cooling air entering each zone will be ambient temperature air.

The molten, substantially anhydrous ammonium nitrate required for the present process may be obtained by an convenient means. However, in the operation of the overall process for the production of ammonium nitrate illustrated schematically in FIGURE 1, an aqueous ammonium nitrate solution is prepared in reactor 40 according to conventional practice. This solution is passed to an evaporator, or a series of evaporators, indicated by the numeral 41, wherein the ammonium nitrate concentration is increased to at least about 98%, and preferably to above 99%, ammonium nitrate. That is, the aqueous ammonium nitrate solution is converted to a substantially anhydrous ammonium nitrate melt. The evaporators 41, which can be of the conventional film type, and the pipe line to the coating-cooling chamber are maintained at a temperature safely above the fusion point of the ammonium nitrate so that the ammonium nitrate melt passed to the spray feed pipe 21 is in a fluid condition.

Ammonium nitrate granules produced in the cooler 10 can be passed to a supplementary cooler 42 and the cooled granules passed to a conventional screening unit 43 in which granules are separated into desired size range ammonium nitrate granules, oversize granules and undersize granules. Preferably, however, the granules from cooler 10 are screened, the production size granules are passed to the supplementary cooler 42 and then to a conditioning unit for coating with a conditioner, such as diatomite.

Cooling air drawn through the cooler 10 and that drawn through the supplementary cooler 42 are passed to dust separators 44, such as cyclones or wet scrubbers, in which entrained ammonium nitrate fines are separated prior to the discharge of the air to the atmosphere.

The cooler 10 used in the test described in detail hereinafter was 8½ feet outside diameter, 45 feet long with an inclination to the horizontal of 0.41 inch per foot of length downwardly from the feed to the discharge end. It was rotated at the rate of four revolutions per minute in a counterclockwise direction considered from the feed end. The retaining ring 15 was positioned 16 feet from the feed end and extended 2 feet prependicularly to the wall. Two sets of 12 uniformly spaced lifting elements each were provided in the coating-cooling chamber. The set nearest the feed end which feeds material towards the second set, comprised lifters 2 feet long extending 6 inches perpendicularly to the wall surface but positioned at an angle of 60° to the longitudinal axis of the chamber. A 6-inch gap was left between the inner ends of these lifters and the ends of the other set of 12 lifting elements 22, each 12 feet long and extending lengthwise of the chamber, each extending 6 inches in a first section perpendicularly to the wall with a second section 6 inches long at an angle of 120° to the first section, and a third, or outer section, 4 inches long at an angle of 110° C. to the second section as shown in FIGURE 4. This apparatus produced desired size ammonium nitrate granules, i.e. granules within a predetermined narrow size range, at a rate of 60 tons per day with a bed maintained at about 9000 pounds.

In the following description of the operation of the process, the term "cores" includes particles of ammonium nitrate which are smaller than the smallest desired product size, that is, less than 0.065 inch diameter but not small enough to be entrained with the exit cooling gas. Particles entrained with the cooling gas can be recovered in the cyclones 44 and redissolved in the ammonium nitrate solution passed to the evaporators.

This invention is independent of the source of the finely divided ammonium nitrate particles, or cores, included in the bed of rolling particles and the downwardly falling curtain of particles in the contact zone, that is, that portion of the coating-cooling chamber limited by the ends of the lifting elements. Satisfactory and logical sources of these cores are the undersize particles recovered from the screening unit 43. Undersize particles are illustrated in FIGURE 1 as being passed to the feed inlet 20. These finely divided particles, together with already coated cores and particles solidified from melt spray not adhering to finely divided particles in the rolling bed and curtain, form the rolling bed and falling curtain in the contact zone. If necessary, the supply of cores can be supplemented by crushing oversize particles recovered from the screening unit. Oversize particles in excess of this amount can be dissolved and returned to the evaporators 41.

The volume of the contact zone occupied by the rolling bed or the degree of filling, which governs the permissible amount of liquid phase in the bed is controlled by several factors such as the size, the degree of inclination to the horizontal, and the rate of rotation of the coating-cooling chamber and the effectiveness of the lifting elements 22; the production rate; the temperature of the ammonium nitrate melt and the heat removal capacity of the cooling air.

In the operation of the process, a bed of desired volume is maintained in the coating-cooling chamber A. The individual particles are in a constantly moving state due to the rotation of the apparatus. The lifting elements carry cores to the upper region of the contact zone where they are released to cascade to the bottom, forming, in effect, a continuous shower or curtain of individual particles designed to fill as much as possible the cross-sectional area of the contact zone.

Substantially anhydrous, molten ammonium nitrate is sprayed in the form of molten droplets into this shower of cores and adheres to and coats the solid particles as they shower downwardly and also adheres to and coats the solid particles at the surface of the moving bed. The liquid coating is further distributed on particles in the bed owing to the contacting, rolling action.

We have found that the concentration and the temperature of the sprayed melt are important. The melt should contain at least about 98% ammonium nitrate. At lower concentrations it is difficult, if not impossible, to avoid uncontrollable agglomeration of cores and high recirculating dust load at a practicable production rate. Concentrations higher than about 99.6% ammonium nitrate are more costly to prepare in the evaporators and are not necessary. The preferred range of concentration is from about 99% to about 99.5%.

The ammonium nitrate melt is sprayed at a temperature of from about 5 to about 25, preferably about 10, centigrade degrees above its crystallization temperature. For example, a melt which contains 98% ammonium nitrate has a crystallization temperature of 149° C. Therefore, the melt would be sprayed at a temperature of at least 154° C. and preferably about 159° C. Similarly, a melt which contains 99.5% ammonium nitrate has a crystallization temperature of 163° C. and would be sprayed at a temperature of about 173° C. The sprays are arranged, of course, to cover the entire length of the contact zone and are preferably directed towards the lifters covered by the rolling bed and cascading particles to avoid liquid contact with bare lifters.

Cooling air, at atmospheric temperature, is drawn into the cooling chamber B and flows into and through the coating-cooling chamber A. Its rate of flow is regulated to provide the cooling effect necessary to solidfy the coatings of sprayed melt on the cores in the time required to avoid particle agglomeration after uniform coating has been accomplished. During the test reported in the examples below, for a total cooler discharge weight of about 180 tons of granulated ammonium nitrate per day, from which about 60 tons per day of product granules within a predetermined narrow size range were recovered, air was supplied at atmospheric temperature, at about 16° C., at the rate of about 6000 standard cubic feet per minute (0° C. and 760 mm. of mercury pressure). The cooling requirement for the anhydrous melt film coating on the cores is determined by the sensible heat content of the melt beyond that at its crystallization temperature, and the heat released as crystallization takes place. For example, the heat of crystallization of 99.5% ammonium nitrate is 31 B.t.u.'s per pound or 17.2 calories per gram.

The most effective results from the spraying of the melt and from the cooling achieved by the flow of air entering the process at ambient temperature are obtained if the design of the lifters in the coating-cooling chamber is such that the distribution of showering particles is as uniform as possible throughout the vertical cross-sectional area of the contact zone, thus reducing "channelling" of the cooling gas to a minimum. The importance of cooling in the present process can be appreciated from the fact that the contact zone is followed directly by a further cooling zone and, preferably, the coating-cooling chamber is only one section of a rotary cooler which is separated into two sections by the retaining ring 15 which helps ensure an adequate depth of bed of cores for the coating treatment. It should be noted that operation of a contact zone and a cooling zone in two succeeding but separate vessels lies within the scope of the present process. An additional rotary cooler 42 can be included, if desired, following the cooler 10 either directly or preferably, with a screening unit 43 between them.

A portion of the cores required to ensure a continuing re-cycle load for feed to the coating-cooling chamber is obtained through solidification of individual sprayed droplets which have not adhered to existing cores. Although agglomeration of larger particles or cores is undesirable, it is helpful to have a certain amount of agglomeration of some of the smaller particles in the bed. This agglomeration helps to form further particles for coating. Coating the cores with the melt film by spraying and cooling the coated particles by intimate contact with the cooling gases are repeated until the particles are of the desired finished product size. The number of times a particle may receive a coating will be affected by how frequently it is in the way of spray droplets while showering downwardly through the contact zone onto the bed of particles or as a surface particle in the rolling bed during its passage through the contact zone and the length of time the particle is in contact with the unsolidified melt in the bed. The time a particle is in the coating-cooling chamber will be influenced, also, by the effect of the pressure of feed cores entering the coating-cooling chamber in pressure thrust towards the discharge end, the effect of back pressure of the coated particles held by the retaining ring, and the effect of the sprayed ammonium nitrate melt hitting the particle. A countercurrent flow of cooling gas hitting the showering particles also tends to increase the time required for particles to pass through the contact zone.

The following examples illustrate the results obtained in the operation of the process of this invention.

EXAMPLE 1

The circuit described above and having the supplementary cooler 42 before the screening unit 43 was operated over a ten-day period during which production attained a maximum of from about 50 to about 60 tons per day of product ammonium nitrate granules approximately of the size range indicated in Table 3. The sprayed melt contained from 98% to 99.6% ammonium nitrate. At the lower concentration and a high spray melt temperature, agglomeration occurred in the bed of particles. The best results were obtained with ammonium nitrate concentrations of from 99% to 99.5%. The ratio of re-cycled undersize and oversize ammonium nitrate particles to particles within the predetermined size range averaged about 2.5:1 or 2.5 tons of re-cycled particles per ton of product granules within the predetermined size range.

The data set out in Tables 1 and 2 hereinafter are illustrative of reasonably stable operating periods. At the start of the test period, the ammonium nitrate concentration was 98.4% and, following that, ranged from 99.4% to 99.6%. Full cone spray pattern nozzles of the "Full-jet" injector type (Spray Systems Company), with $13/64$ inch orifice, were used in the test.

*Table 1*

COOLER

| | $NH_4NO_3$, percent | Crystallizing Temp., °C. | Spray pressure, p.s.i. | Spray Temp., °C. | Cooling Air Temperature, °C. | | Salt Temperature, °C., Out | Moisture Content Product Granules, percent |
|---|---|---|---|---|---|---|---|---|
| | | | | | In | Out | | |
| 1 | 98.4 | 152 | 21.5 | 180 | 13 | 52 | 35 | .18 |
| 2 | 99.5 | 163 | 20.5 | 176 | 17 | 65 | 45 | .05 |
| 3 | 99.4 | 162 | 18.0 | 174 | 18 | 66 | 47 | .04 |

Table 2
SUPPLEMENTARY COOLER

| | Cooling Air Temperature, °C. | | Salt Temperature, °C., Out | Moisture Content Product Granules, Percent | Product—Pounds per minute | | | |
|---|---|---|---|---|---|---|---|---|
| | In | Out | | | O'Size | Product | Re-cycle [1] | Re-cycle: Product Ratio |
| 1 | 13 | 30 | 20 | .13 | [2] n.a. | 47 | 157 | 3.3:1 |
| 2 | 17 | 36 | 19 | .05 | 18 | 84 | 144 | 1.7:1 |
| 3 | 18 | 38 | 26 | .03 | 7 | 74 | 142 | 1.9:1 |

[1] Re-cycle includes oversize material which in this test was not re-cycled as dry feed.
[2] Not available.

EXAMPLE 2

Samples of product from the above operation were taken and compared with samples of commercially available prilled ammonium nitrate produced at two different conventional spray tower plants. Comparisons were made on the basis of bulk density, screen analysis, sphericity (determined by percentage of particles rolling from top to bottom of an inclined plane), hardness, and tendency to cake (short term test only).

The results, which are tabulated below, showed that the granules coated by the present process:

(a) Have a greater bulk density than prills, thereby permitting use of smaller bags for packaging;
(b) Can be obtained in larger sizes than are obtained by prilling;
(c) Have reasonable sphericity, relative to the prilled product;
(d) Are harder individually than ammonium nitrate prills; and
(e) Present a reduced caking problem when adequate diatomite coating is used.

The improved physical characteristics of ammonium nitrate granules produced by the present process over those of prills produced by a conventional spray process are illustrated by Table 3.

Table 3

| | Present Process | Conventional Process | |
|---|---|---|---|
| | | Plant A Prill | Plant B Prill |
| Bulk Density (lbs./cu. ft.) | 53.7 | 48.8 | 47.7 |
| Screen Analysis (in percent) Standard Tyler: | | | |
| Mesh— | | | |
| +6 | 0.4 | | |
| +8 | 51.5 | 0.3 | 1.2 |
| +10 | 94.7 | 58.5 | 54.3 |
| +12 | 97.1 | 78.5 | 74.7 |
| +14 | 98.9 | 93.4 | 88.7 |
| +20 | 99.7 | 98.5 | 96.6 |
| +28 | 99.8 | 99.2 | 98.8 |
| +35 | 99.9 | 99.5 | 99.6 |
| +100 | 99.9 | 99.7 | 99.8 |
| −100 | 0.1 | 0.3 | 0.2 |
| Sphericity (percent −8 mesh (0.093 inch) to +10 mesh (0.065 inch) particles rolling to bottom of inclined plane) | 17.5 | 21.4 | 9.0 |
| Hardness (Weight in grams to crush 50% of particles from sphericity test) | 1,840 | 750 | 1,060 |
| Caking: | | | |
| Cake breaking strength, lbs | 22±6 | 46±6 | 37±6 |
| Diatomite coating level, percent | 2.5 | 2.7 | 3.9 |

NOTE.—Adhesion of diatomite addition to granules produced by the present process up to and including 3% is good.

For any set production rate, set re-cycle rate and set finished product size range, an equilibrium condition will obtain in the coating-cooling chamber, despite the apparent changes continuously taking place therein. While particles are continuously agitated in the moving bed and rolling one against another, other particles, many of which have already been coated with melt, are continuously being carried by the lifters out of the rolling bed, while at the same time further particles are being showered down from lifters through the melt spray. Screened undersize and crushed oversize particles are continuously added at the feed end and molten ammonium nitrate is added by means of the melt spray. Coated granules continuously advance toward and pass over retaining ring 15 into the cooling chamber B.

The efficient transfer of heat to the cooling gas from the cores is important.

The large mass of rolling particles in the particle bed tends to retain heat. Cooling effect is relative to the ratio of showering to rolling particles, that is the ratio of lifted to unlifted material. It may be thought that the most rapid solidification of the melt coating is the desirable goal, but it is a solidification achieved through controlled cooling which is desired. Should a colder gas be used for cooling purposes, then a lesser volume would be admitted in order that the same overall cooling effect would result. Although additional expenditure could be made to supply artificially cooled air, this is considered unnecessary in normal operation. When producing 60 tons per day of desired product size granules the supply indicated earlier, say 6000 standard cubic feet per minute, of air at ambient temperature which, in the plants where the above test work was carried out, ranges from about 10° C. to 30° C. over the year, is satisfactory for operation of the process.

It has been emphasized above that the important feature of the cooling air is its capacity for removal of sensible heat, regardless of the initial temperature of the gas or the volume used. There are practical limitations on the initial temperature of the cooling gas, for not only must it be cooler than both the spray melt and the particles of the rolling bed in order that a more rapid solidification be achieved than is possible merely by contact of the melt film and the particles which are at a lower temperature than the melt but, as has been already stated, physically weakened ammonium nitrate particles tend to be produced if nuclei having even as low a water content as 0.35% are permitted to remain at a temperature over 80° C. It is desirable, therefore, to have the inlet temperature of the cooling gas sufficiently low that the temperature of cooled particles being screened be lower than 80° C. Although satisfactory operation of the process may be achieved with the temperature of the cooling air leaving the cooler reaching as high as 100° C., it is preferable that this temperature not exceed 80° C. The ambient temperature of the air in any location where the process of this invention might be operated is unlikely to be higher than about 50° C. and use of an adequate flow of cooling air at such a temperature to achieve satisfactory cooling is quite practicable.

As stated previously, the purpose of the cooling air in the contact zone is to remove heat from the ammonium nitrate thereby causing it to solidify and harden. Most of the small amount of water vapour that may be present in the melt is evaporated incidentally as the melt solidifies, the heat content of the melt supplying the necessary energy for evaporation. Any water vapour formed is carried out of the drum with the cooling air. The air, however, does not provide heat for the evaporation of moisture as the air is always much cooler than the sprayed melt. As indicated above, the maximum temperature of the cooling air leaving the contact zone is 100° C., and the minimum temperature of the sprayed melt is 154° C., a difference of 54 degrees. The temperature of the air passing through said contact zone, therefore, is much lower, at least about 50 centigrade degrees lower, than the temperature of the molten coating sprayed onto the particles in the contact zone.

We have also stated above that we recommend the temperature of the melt for spraying be within the range of from about 5 to about 25 centigrade degrees above the crystallization temperature of the melt. Operational difficulties arise if the melt temperature lies outside this range. For example, very careful temperature control through the length of the spray feed lines is essential, of course, to avoid solidification of the melt at temperatures below the range, and also, it is essential to ensure that the sprayed material remain liquid long enough to coat the cores uniformly. With melt temperatures above the range, apart from the unnecessary heating and cooling required, uncontrollable agglomeration occurs in the contact zone.

The process of this invention possesses a number of important advantages over known prior art processes for the production of ammonium nitrate granules. It provides a process for forming fertilizer granules which are coarser and are more closely sized than those which can be produced on an economically practical basis in a conventional spray tower. A harder product of greater bulk density is produced, possibly as a result of the contraction effect of solidifying successive melt layers on a cooler, solid dry core. Although the granules are generally spherical, that is, spheroidal the surfaces of the granules have a rough and irregular texture which permits good dust adherence in the conditioning step which usually is followed to reduce the caking tendency of the granules in storage.

It will be understood, of course, that modifications can be made in the preferred embodiment of the invention described herein without departing from the scope of the invention as defined by the appended claims.

What we claim as new and desire to protect by Letters Patent of the United States is:

1. The process of producing ammonium nitrate granules which comprises forming and maintaining in a rotating horizontally elongated contact zone a bed of moving solid particles of ammonium nitrates; adding finely divided solid particles of ammonium nitrate to said bed; advancing said particles through said contact zone; continuously raising solid particles from said bed to the upper region of said contact zone; releasing the raised solid particles to cascade downwardly through said contact zone, as a continuous curtain of solid ammonium nitrate particles extending substantially the length of said contact zone, to the bed; spraying, at a temperature within the range of from about 5 to about 25 centigrade degrees above its crystallization temperature, molten, substantially anhydrous ammonium nitrate onto said bed and into the curtain of solid particles cascading downwardly through said contact zone onto the said bed; and continuously passing a current of cooling air through said contact zone counter-current to the direction of advance of said particles.

2. The process of producing ammonium nitrate granules which comprises forming and maintaining a bed of continuously moving solid particles of ammonium nitrate in the contact zone of a rotating vessel having a horizontally elongated contact zone and a cooling zone; adding finely divided solid particles of ammonium nitrate to said bed; advancing said particles through said contact zone; spraying molten, substantially anhydrous ammonium nitrate at a temperature of from about 5 to about 25 centigrade degrees above its crystallization temperature onto said bed and into a continuously cascading curtain of solid particles of ammonium nitrate extending substantially the length of said contact zone; simultaneously contacting the continuously cascading curtain of solid ammonium nitrate particles with a current of cooling air flowing counter-current to the direction of advance of said particles; continuously passing solid particles of ammonium nitrate from said contact zone to said cooling zone; passing said solid particles through said cooling zone in contact with a counter-current flow of cooling air; and withdrawing solid particles from said cooling zone.

3. The process of producing ammonium nitrate granules which comprises forming and maintaining a bed of continuously moving solid particles of ammonium nitrate in the contact zone of a rotating vessel having a horizontally elongated contact zone and a cooling zone; continuously adding finely divided solid particles of ammonium nitrate to said bed; advancing said particles through said contact zone; spraying molten, substantially anhydrous ammonium nitrate at a temperature of from about 5 to about 25 centigrade degrees above its crystallization temperature onto said bed and into a continuously cascading curtain of solid particles of ammonium nitrate extending substantially the length of said contact zone; simultaneously contacting the continuously cascading curtain of solid ammonium nitrate particles with a current of cooling air flowing counter-current to the direction of advance of said particles; continuously passing solid particles of ammonium nitrate from said contact zone to said cooling zone; passing said solid particles through said cooling zone in contact with a counter-current stream of air fed into said cooling zone at ambient temperature; and withdrawing solid particles from said cooling zone.

4. The process of producing ammonium nitrate granules which comprises forming a bed of continuously moving solid particles of ammonium nitrate in the contact zone of a rotating vessel having a horizontally elongated contact zone and a cooling zone; advancing said particles through said contact zone; spraying molten, substantially anhydrous ammonium nitrate at a temperature of from about 5 to about 25 centigrade degrees above its crystallization temperature onto said bed and into a continuously cascading curtain, extending substantially the length of said contact zone, of solid particles of ammonium nitrate; simultaneously contacting the continuously cascading curtain of solid ammonium nitrate particles with a current of cooling air flowing counter-current to the direction of the advance of said particles; continuously passing solid particles of ammonium nitrate from said contact zone to said cooling zone; passing said solid particles through said cooling zone in contact with a flow of cooling air; withdrawing cooled solid particles from said cooling zone; separating cooled solid particles of ammonium nitrate within a predetermined size range from said withdrawn cooled solid particles as product ammonium nitrate granules; and re-cycling cooled solid particles of ammonium nitrate smaller than those within said predetermined size range to said contact zone.

5. The process of producing ammonium nitrate granules which comprises forming in a rotating horizontally elongated contact zone a bed of continuously moving solid particles of ammonium nitrate; advancing said particles through said contact zone; continuously raising solid particles from said bed to the upper region of said contact zone; releasing said raised solid particles to cascade downwardly to the bed through said contact zone as a continuous curtain of solid ammonium nitrate particles extending substantially the length of said contact zone; spraying molten, substantially anhydrous ammonium nitrate at a temperature of from about 5 to about 25 centigrade degrees above its crystallization temperature onto said bed and into said curtain of solid particles of ammonium nitrate; simultaneously contacting the continuously cascading curtain of solid ammonium nitrate particles with a current of cooling air flowing counter-current to the direction of advance of said particles; continuously passing solid particles of ammonium nitrate from said contact zone to a rotating horizontally elongated cooling zone; continuously passing said solid particles through said cooling zone in contact with a flow of cooling air; continuously passing cooled, solid particles from said cooling zone to a screening step wherein the particles are separated into particles within a predetermined coarse size range, oversize particles and undersize particles; collecting the cooled particles within said predetermined coarse size range; returning cooled undersize particles to the bed in said contact zone to be advanced therethrough; crushing cooled oversize particles and passing crushed particles to the bed in said contact zone to be advanced therethrough; passing said cooled particles within said predetermined coarse size range to a conditioning step; and recovering particles from said conditioning step as final product granules.

6. The process according to claim 5 in which the temperature of the air passing through said contact zone does not exceed 100° C.

7. Ammonium nitrate in the form of strong rough-textured, spheroidal granules, said granules being uniformly sized in the range of from about 0.131 to about 0.065 inch in diameter and having a hardness greater than 1800 grams with reference to Table 3.

8. A fertilizer consisting of strong, rough-textured, spheroidal, conditioned granules of ammonium nitrate, said granules being uniformly sized in the range of from about 0.131 to about 0.065 inch in diameter, and having a bulk density greater than 50 pounds per cubic foot and a hardness greater than 1800 grams with reference to Table 3.

9. The process according to claim 5 in which the temperature of the air passing through said contact zone is at least about 50 centigrade degrees lower than the temperature of the molten coating sprayed onto the particles in said contact zone.

10. The process of producing ammonium nitrate granules which comprises the steps of evaporating aqueous ammonium nitrate solution to convert said solution to molten, substantially anhydrous ammonium nitrate; forming in a rotating horizontally elongated contact zone a bed of continuously moving solid particles of ammonium nitrate; advancing said particles through said contact zone; continuously raising solid particles from said bed to the upper region of said contact zone; releasing said raised solid particles to cascade downwardly to the bed through said contact zone as a continuous curtain of solid ammonium nitrate particles extending substantially the length of said contact zone; spraying said molten, substantially anhydrous ammonium nitrate at a temperature of from about 5 to about 25 centigrade degrees above its crystallization temperature onto said bed and into said curtain of solid particles of ammonium nitrate; simultaneously contacting the continuously cascading curtain of solid ammonium nitrate particles with a current of cooling air flowing counter-current to the direction of advance of said particles; continuously passing solid particles of ammonium nitrate from said contact zone to a rotating horizontally elongated cooling zone; continuously passing said solid particles through said cooling zone in contact with a flow of cooling air; continuously passing cooled, solid particles from said cooling zone to a screening step wherein the particles are separated into particles within a predetermined coarse size range, oversize particles and undersize particles; collecting the cooled particles within said predetermined coarse size range; returning cooled undersize particles to the bed in said contact zone to be advanced therethrough; crushing a portion of said cooled oversize particles and passing crushed particles to the bed in said contact zone to be advanced therethrough; dissolving the remaining portion of cooled oversize particles in aqueous ammonium nitrate solution prior to the evaporation step; passing said cooled particles within said predetermined coarse size range to a conditioning step; and recovering particles from said conditioning step as final product granules.

References Cited by the Examiner

UNITED STATES PATENTS

| 2,774,660 | 12/1956 | Cook et al. | |
| 2,782,108 | 2/1957 | Antle | 23—103 X |
| 2,934,412 | 4/1960 | Stengel | 23—103 X |
| 3,027,267 | 3/1962 | Allen et al. | 23—103 X |
| 3,041,159 | 6/1962 | Smith | 23—103 X |

MAURICE A. BRINDISI, *Primary Examiner.*